(12) United States Patent
Guccione

(10) Patent No.: US 7,707,250 B2
(45) Date of Patent: Apr. 27, 2010

(54) WIRELESS COMMUNICATIONS CONNECTION DEVICE

(75) Inventor: Darren S. Guccione, Wheaton, IL (US)

(73) Assignee: Callpod, Inc., Chicago, IL (US)

( * ) Notice: Subject to any disclaimer, the term of this patent is extended or adjusted under 35 U.S.C. 154(b) by 229 days.

(21) Appl. No.: 11/381,210

(22) Filed: May 2, 2006

(65) Prior Publication Data

US 2007/0260682 A1 Nov. 8, 2007

(51) Int. Cl.
*G06F 15/16* (2006.01)
(52) U.S. Cl. .................. 709/205; 709/218; 709/228; 709/231; 709/248
(58) Field of Classification Search .............. 370/337; 707/10; 709/203, 217, 219, 230, 231
See application file for complete search history.

(56) References Cited

U.S. PATENT DOCUMENTS

| | | | |
|---|---|---|---|
| D121,478 S | 7/1940 | Loewy | |
| 3,541,258 A | 11/1970 | Doyle et al. | |
| 3,601,904 A | 8/1971 | Elliot et al. | |
| 4,160,122 A | 7/1979 | Jacobson | |
| 4,229,829 A | 10/1980 | Grunwald | |
| 4,567,332 A | 1/1986 | Jamison | |
| 4,715,063 A | 12/1987 | Haddad et al. | |
| 4,716,585 A | 12/1987 | Tompkins et al. | |
| 4,882,745 A | 11/1989 | Silver | |
| 4,972,457 A | 11/1990 | O'Sullivan | |
| D327,886 S | 7/1992 | Yan | |
| 5,133,002 A | 7/1992 | Kikuchi et al. | |

(Continued)

FOREIGN PATENT DOCUMENTS

| EP | 0187696 | 7/1986 |
|---|---|---|
| EP | 0187696 A2 | 7/1986 |
| EP | 0533935 | 3/1993 |

(Continued)

OTHER PUBLICATIONS

EP Search Report dated Apr. 24, 2005 for EP05257751.7.

(Continued)

*Primary Examiner*—Quang N. Nguyen
(74) *Attorney, Agent, or Firm*—Levenfeld Pearlstein, LLC

(57) ABSTRACT

A method and apparatus is provided for setting up a wireless conference call, wireless non-call conference, and sharing audio and/or video content. The method includes the steps of providing an audio mixer that receives an audio input from each of at least three audio interfaces, mixes, cleans, and amplifies and/or de-amplifies the audio signal from the audio inputs and provides an equalized audio output to each of the at least three audio interfaces; providing a first local wireless interface between a first audio interface of the at least three audio interfaces and a wireless headset of a first local participant; providing a second local wireless interface between a second audio interface of the at least three audio interfaces and a wireless headset of a second local participant; and, providing a third wireless interface between a third audio interface of the at least three audio interfaces and a remote communications means for communicating with a remote participant, wherein the communication paths to the first local participant, second local participant and the remote participant are all discrete, so as to permit simultaneous two-way (incoming and outgoing) communications between each participant during wireless conferencing between the local participants and during wireless conferencing between the local participants and the remote participant, and so as to permit simultaneous one-way communications between an audio and/or video content source and each local participant during wireless sharing of audio and/or video content between the local participants.

46 Claims, 1 Drawing Sheet

U.S. PATENT DOCUMENTS

| | | | |
|---|---|---|---|
| 5,210,791 A | 5/1993 | Krasik |
| 5,226,077 A | 7/1993 | Lynn et al. |
| 5,233,645 A | 8/1993 | Choi et al. |
| D340,455 S | 10/1993 | Christian |
| D350,735 S | 9/1994 | Karlin et al. |
| 5,359,647 A | 10/1994 | Regen et al. |
| D353,783 S | 12/1994 | Burns |
| 5,487,182 A | 1/1996 | Hansson |
| 5,488,657 A | 1/1996 | Lynn et al. |
| 5,504,812 A | 4/1996 | Vangarde |
| 5,528,666 A | 6/1996 | Weigand et al. |
| 5,557,653 A | 9/1996 | Paterson et al. |
| 5,590,417 A | 12/1996 | Rydbeck |
| 5,596,638 A | 1/1997 | Paterson et al. |
| 5,625,673 A | 4/1997 | Grewe et al. |
| RE35,536 E | 6/1997 | Irissou et al. |
| D387,758 S | 12/1997 | Oross et al. |
| D389,158 S | 1/1998 | Oross |
| D391,953 S | 3/1998 | Copeland et al. |
| 5,764,743 A | 6/1998 | Goedken et al. |
| 5,787,180 A | 7/1998 | Hall et al. |
| 5,797,089 A | 8/1998 | Nguyen |
| 5,812,683 A | 9/1998 | Parker et al. |
| 5,832,075 A | 11/1998 | Gancarcik |
| 5,844,824 A | 12/1998 | Newman et al. |
| 5,890,074 A | 3/1999 | Rydbeck et al. |
| D410,228 S | 5/1999 | Jones |
| 5,909,432 A | 6/1999 | Arends et al. |
| D412,501 S | 8/1999 | Tyneski et al. |
| 5,951,317 A | 9/1999 | Tracy et al. |
| D415,131 S | 10/1999 | Chang |
| 5,978,689 A | 11/1999 | Tuoriniemi et al. |
| 5,982,879 A | 11/1999 | Lucey |
| 5,983,100 A | 11/1999 | Johansson et al. |
| 5,991,398 A | 11/1999 | Lipton et al. |
| D417,465 S | 12/1999 | Kreitz et al. |
| 6,026,082 A | 2/2000 | Astrin |
| 6,029,072 A | 2/2000 | Barber |
| D425,484 S | 5/2000 | Ahlgren |
| 6,078,825 A | 6/2000 | Hahn et al. |
| D430,052 S | 8/2000 | Nowak |
| 6,130,602 A | 10/2000 | O'Toole et al. |
| 6,144,848 A | 11/2000 | Walsh et al. |
| D438,856 S | 3/2001 | Uehara |
| D444,779 S | 7/2001 | Hin |
| D446,207 S | 8/2001 | Matthes et al. |
| 6,321,080 B1 | 11/2001 | Diethorn |
| D452,684 S | 1/2002 | Sedan et al. |
| D453,154 S | 1/2002 | Astradsson |
| D454,556 S | 3/2002 | Schmidt et al. |
| 6,405,027 B1 | 6/2002 | Bell |
| 6,434,402 B1 | 8/2002 | Davison et al. |
| 6,470,197 B1 | 10/2002 | Tuoriniemi et al. |
| 6,594,366 B1 | 7/2003 | Adams |
| 6,615,059 B1 | 9/2003 | Pehrsson et al. |
| 6,650,871 B1 | 11/2003 | Cannon et al. |
| 7,254,123 B2 * | 8/2007 | Jukarainen .................. 370/337 |
| 2003/0002644 A1 | 1/2003 | Guccione et al. |
| 2004/0086093 A1 | 5/2004 | Schranz |
| 2004/0116130 A1 | 6/2004 | Seligmann |
| 2004/0266443 A1 | 12/2004 | Ito |
| 2005/0122389 A1 | 6/2005 | Miao |
| 2005/0233778 A1 | 10/2005 | Rodman et al. |
| 2006/0251115 A1 | 11/2006 | Haque et al. |
| 2007/0186002 A1 * | 8/2007 | Campbell et al. ........... 709/231 |
| 2007/0260682 A1 | 11/2007 | Guccione |
| 2007/0294263 A1 * | 12/2007 | Punj et al. .................... 707/10 |

FOREIGN PATENT DOCUMENTS

| | | |
|---|---|---|
| FR | 2223915 | 10/1974 |
| JP | 6-237483 | 8/1994 |
| JP | 10-136100 | 5/1998 |
| JP | 10-210162 | 8/1998 |
| JP | 11-355450 | 12/1999 |
| JP | 2003-140985 | 5/2003 |
| WO | WO 01/43351 | 6/2001 |
| WO | WO0143351 | 6/2001 |
| WO | 2007024250 | 3/2007 |

OTHER PUBLICATIONS

International Search Report dated June 20, 2008 for PCT/US07/68054.

International Search Report dated Aug. 24, 2007 for PCT/US05/44067.

International Preliminary Report on Patentability dated Feb. 20, 2008 for PCT/US05/44067.

* cited by examiner

WIRELESS COMMUNICATIONS CONNECTION DEVICE

BACKGROUND OF THE INVENTION

The present invention is directed to a wireless communications system. More particularly, the present invention is directed to a wireless communications connection device for conferencing and content sharing among a number of participants in a mobile environment.

Conference calls are an essential part of business worldwide. Many companies operate on a national or multinational level. Where operations must be coordinated, then the need for conference calls between remote offices becomes obvious.

Typically one or more local parties to a conference call gather in a conference room to place a call to the remote party. A conference phone is placed in the center of a table surrounded by conference participants. A conference phone also may be utilized at the remote location to permit a plurality of remote parties to participate in the conference call. Such conference phones are typically provided with microphones/speakers on two or more sides and a volume control.

Conference phones tend to operate in only one direction at a time because of feedback. In most cases, if a conference phone is receiving a voice signal from a remote party, it disables a local microphone. If a speaker should pause or finish speaking, then the microphones on both ends may be activated. In this case, the first side to begin speaking would gain control of the channel.

While conference phones work relatively well, they suffer from a number of deficiencies. In addition to the difficulty caused by both sides speaking at the same time, not all participants around a conference table can hear or be heard, especially if such participant is not directly in front of the speaker.

In order to solve the problems associated with prior art conference calling, U.S. Pat. No. 6,801,611 to Guccione et al. describes a hand-held conferencing device into which participants may plug headsets. A remote party may be joined to the conference call via a cellular telephone or other personal communications device.

"While Guccione et al. is an improvement over prior devices, it still failed to offer conference call participants the needed mobility. For example, conference calls may often be required at inconvenient times and in inconvenient places. Moreover, the need to carry an extra hand-held conferencing device is inconvenient and unnecessary."

Accordingly, there exists a need for conferencing features that are more convenient and that allow wireless communications between conferencing participants, both during a conference call and in the absence of a conference call ("non-call conferencing"). Applicant developed a technology to address such a need as described in Applicant's co-pending U.S. patent application for "Mobile Conferencing and Audio Sharing Technology," Ser. No. 11/208,147, filed on Aug. 19, 2005, which is incorporated herein by reference in its entirety.

However, the need for wireless conferencing communications extends well beyond the context and framework of traditional wired and cellular conference calls and wireless non-call conferencing. For example, the need exists for a wireless communications device that not only allows local participants to wirelessly participate in conference calls and to wirelessly conference with other local participants in a non-call setting, but also permits participants to wirelessly share content (such as audio and/or video content, including stereo music and the like), and to wirelessly conference with any audio device and/or application that supports the appropriate wireless communications protocol, such as Bluetooth ("BT"), Ultra-Wideband ("UWB"), or future technologies.

Similarly, a need exists for a wireless communications device that permits local participants to wirelessly share audio and/or video content while awaiting a conference call and, when the conference call is initiated, or when a non-call conference is desired, to seamlessly switch from wireless content sharing to wireless conference calling or wireless non-call conferencing. Once the wireless conference call and/or wireless non-call conference is complete, the device would permit local participants to return to wireless content sharing.

Such a wireless communications device also would allow multiple local participants, through the use of a personal computer or a suitable personal communications device, for example, to wirelessly conference on "calls" made using voice-over-IP ("VOIP") technology (such as those services currently offered by Vonage, Skype, and the like), and to wirelessly conference on audio and/or video "chats" using webcams (such as through the MSN's Messenger service and AOL's Instant Messenger service). The use of such a device in such applications would eliminate the troublesome issues of feedback (often created in such situations when a microphone is located in close proximity to a speaker) and clipping and distortion (often caused when many local participants attempt to speak at the same time or speak loudly in an attempt to be heard over other local participants).

Further, taking the wireless conferencing communications concept a step further, such a device would permit conferencing among local participants across a large local area through the use of repeaters. Such a device could be used, for example, by a security team in an office building or sports arena to communicate via wireless conferencing, replacing traditional one-way "walkie talkie"-style communications devices.

Accordingly, a need exists for a wireless communications device that satisfies all of the foregoing needs. The wireless communications connection device of the present invention satisfies the foregoing needs.

BRIEF SUMMARY OF THE INVENTION

A method and apparatus is provided for wireless conferencing between a plurality of local participants, for wirelessly conferencing between a plurality of local participants and a remote participant, and for wirelessly sharing audio and/or video content between the plurality of local participants.

The method includes the steps of providing an audio mixer that receives an audio input from each of at least three audio interfaces, mixes, cleans, and amplifies and/or de-amplifies the audio signal from the audio inputs and provides an equalized audio output to each of the at least three audio interfaces; providing a first local wireless interface between a first audio interface of the at least three audio interfaces and a wireless headset of a first local participant; providing a second local wireless interface between a second audio interface of the at least three audio interfaces and a wireless headset of a second local participant; and, providing a third wireless interface between a third audio interface of the at least three audio interfaces and a remote communications means for communicating with a remote participant, wherein the communication paths to the first local participant, second local participant and the remote participant are all discrete, so as to permit simultaneous two-way (incoming and outgoing) communications between each participant during wireless conferencing between the local participants and during wireless conferencing between the local participants and the remote participant, and so as to permit simultaneous one-way communications between an audio and/or video content source and each local participant during wireless sharing of audio and/or video content between the local participants, and wherein the audio and/or video content source is included within the remote communications means.

In another embodiment of the present invention, the method includes the steps of providing an audio mixer that receives an audio input from each of at least four audio interfaces, mixes, cleans, and amplifies and/or de-amplifies the audio signal from the audio inputs and provides an equalized audio output to each of the at least four audio interfaces; providing a first local wireless interface between a first audio interface of the at least four audio interfaces and a wireless headset of a first local participant; providing a second local wireless interface between a second audio interface of the at least four audio interfaces and a wireless headset of a second local participant; providing a third wireless interface between a third audio interface of the at least four audio interfaces and a remote communications means for communicating with a remote participant; and providing a fourth wireless interface between a fourth audio interface of the at least four audio interfaces and an audio and/or video content source, wherein the communication paths to the first local participant, second local participant and the remote participant are all discrete, so as to permit simultaneous two-way communications (incoming and outgoing) between each participant during wireless conferencing between the local participants and during wireless conferencing between the local participants and the remote participant, and so as to permit simultaneous one-way communications between the audio and/or video content source and each local participant during wireless sharing of audio and/or video content between the local participants.

In either embodiment, the method in respect to wireless sharing of audio and/or video content between the local participants includes use of the otherwise two-way communications paths in a one-way configuration to permit stereo audio (separated into left and right audio channels) to be transmitted to the local participants, with one audio channel transmitted over the standard outgoing path and the other audio channel transmitted over the standard incoming path, which has been reversed to a secondary outgoing path in this configuration.

The method further includes means to switch between wireless conferencing between the local participants, wireless conferencing between the local participants and the remote participant, and wireless sharing of audio and/or video content between the local participants.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
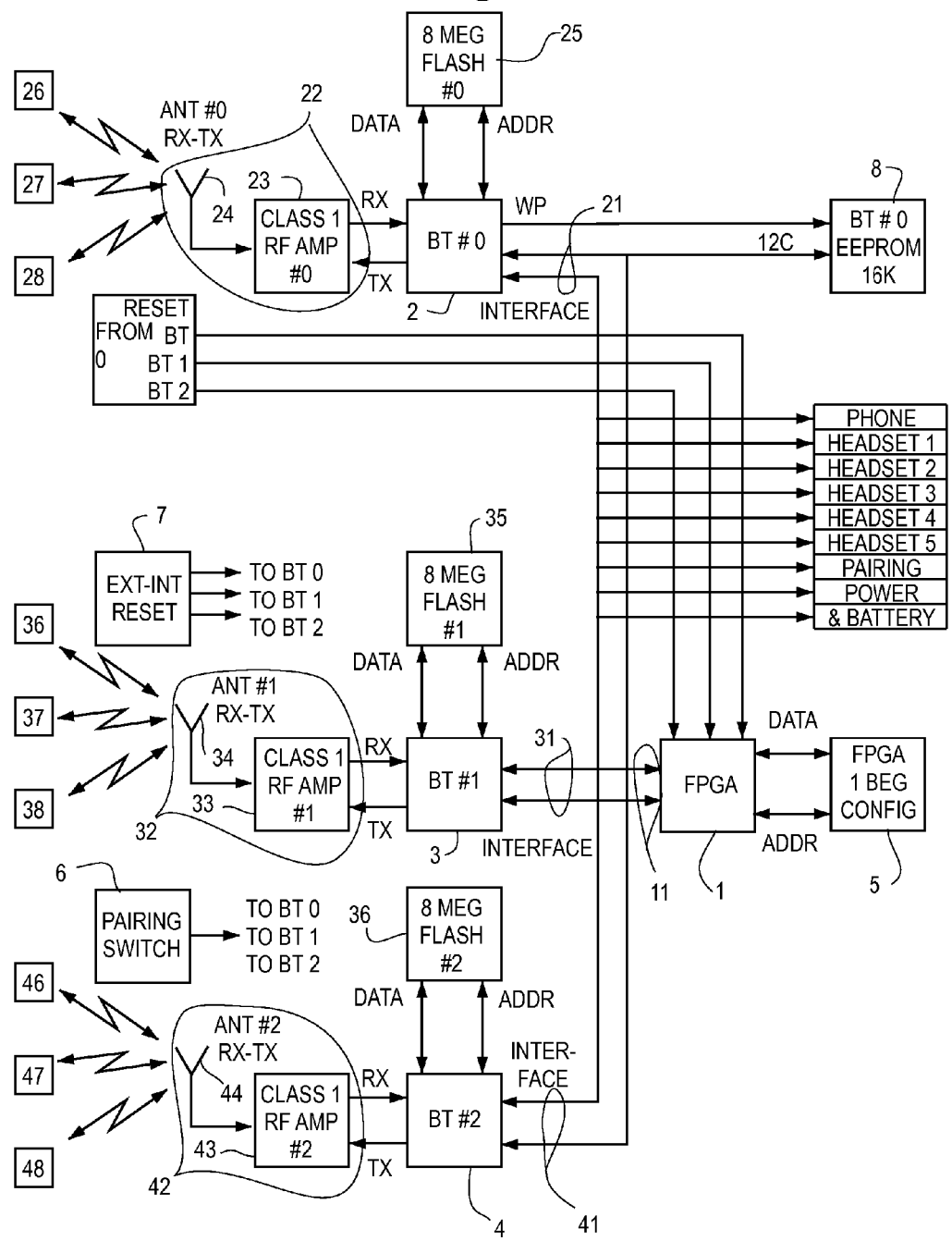
FIG. 1 is a block diagram of the wireless communications connection device of the present invention.

While the present invention is susceptible of embodiment in various forms, there is shown in the figures and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention," relates to a requirement of the United States Patent Office, and does not imply, nor should be inferred to limit the subject matter disclosed herein.

FIG. 1 is a block diagram of the wireless communications connection device in the preferred embodiment of the present invention. It will be appreciated, however, that the device shown in FIG. 1 and as described herein may be disposed within various components without departing from the scope of this disclosure. For example, the wireless communications device in the preferred embodiment of the present invention may be disposed within a free standing, dedicated wireless communications module, within a cellular phone, within a personal digital assistant, within an MP3 player (or similar audio playback device), within a personal computer, or within any number of similar electronic devices with audio capabilities.

As shown in FIG. 1, the wireless communications device of the present invention is comprised of a mixer 1 interactively coupled with a plurality of wireless controllers 2, 3 and 4. As further discussed below, it will be appreciated that, without departing from the scope of this disclosure, and without affecting the operational nature of the disclosed device, the number of wireless controllers will vary depending upon the particular wireless communications protocol used (Bluetooth, Ultra-Wideband, etc.) and the maximum number of local participants intended to be supported by the device. In the preferred embodiment of the present invention, three wireless controllers are utilized.

Mixer 1 in the preferred embodiment of the present invention comprises a field-programmable gate array ("FPGA"). As well known to those skilled in the art, an FPGA is a semiconductor device containing programmable logic components and programmable interconnects. Mixer 1 is further interactively coupled with a programmable read only memory ("PROM") module 5. When the wireless communications connection device is powered on, mixer 1 interacts with PROM module 5 to receive and load the programming required for the operation of mixer 1.

Mixer 1 is programmed as a digital signal processor. That is, mixer 1 is programmed to receive digital audio input signals from the wireless controllers 2, 3 and 4 through audio interfaces 21, 31 and 41, respectively, to digitally mix, clean, and amplify and/or de-amplify the audio input signals, and to transmit the mixed, cleaned, and equalized digital audio output to the wireless controllers 2, 3 and 4 through audio interfaces 21, 31 and 41, respectively. The digital audio communications between mixer 1 and wireless controllers 2, 3 and 4 use multi-slot pulse-code modulation ("PCM") streams as are well known in the prior art.

Wireless controllers 2, 3 and 4 in the preferred embodiment of the present invention are Bluetooth radio devices each having a local wireless interface 22, 32, and 42, respectively. Local wireless interfaces 22, 32 and 42 further comprise RF amplifiers 23, 33 and 43, respectively, as well as antennas 24, 34 and 44, respectively, for transmitting and receiving wireless communications. In some embodiments of the present invention, when the wireless communications connection device is disposed within another electronic audio device already having an antenna, such as a cellular phone or a computer, antennas 24, 34 and 44 may be replaced by the antenna of such electronic audio device.

In the preferred embodiment, RF amplifiers are of the Class 1 variety, permitting wireless communications within an approximate range of 100 meters. However, it will be appreciated that the range of the system may be extended to greater distances by using a system of repeaters, and/or by using more powerful amplifiers (where permitted). Local wireless interfaces 22, 32 and 42 are designed to pairingly connect wireless controllers 2, 3 and 4 with other electronic audio devices with Bluetooth capabilities, such as headsets, cellular phones, computers, MP3 players and the like. Without departing from the scope of this disclosure, it will be appreciated that the wireless controllers 2, 3 and 4 may operate under any appropriate communications protocol, including Bluetooth, Ultra-Wideband, and related future developed protocols.

Additionally in the preferred embodiment of the wireless communications connection device of the present invention, wireless controllers 2, 3 and 4 are interactively coupled with flash memory modules 25, 35 and 36, respectively. When the wireless communications connection device is powered on, wireless controllers 2, 3 and 4 interact with flash memory modules 25, 35 and 36, respectively, to receive and load the programming required for the operation of wireless controllers 2, 3 and 4.

A detailed description of the operation of the preferred embodiment of wireless communications connection device of the present invention follows.

Under the preferred embodiment, the wireless communications connection device of the present invention acts as the base of at least one local wireless network (a "piconet"). Each wireless controller 2, 3 and 4 is capable of establishing an independent piconet to communicate with a plurality of wireless audio communications devices (26, 27, 28, 36, 37, 38, 46, 47 and 48) such as cellular phones, headsets, computers, MP3 players and the like, under an appropriate communication protocol (e.g., Bluetooth, Ultra-Wideband, any other future protocol which can support communication with two audio channels, etc.).

Within the piconet, each wireless controller 2, 3 and 4 may function as a master and the plurality of wireless audio communications devices (26, 27, 28, 36, 37, 38, 46, 47 and 48) may function as slaves. It should be understood that while only nine slave devices (26, 27, 28, 36, 37, 38, 46, 47 and 48) are shown in FIG. 1, the wireless communications connection device of the present invention is scalable to support any number of slave devices, the limiting factor being the communication protocol. For example, as further discussed below, current Bluetooth technology can support up to three slaves using synchronous connection-oriented links ("SCOs") and up to seven slaves using asynchronous connectionless links ("ACLs"). Thus, in the preferred embodiment of the present invention, which uses SCO links for transmission of voice audio, as discussed below, each wireless controller 2, 3 and 4 can support up to three slave devices.

The wireless controllers 2, 3 and 4 may use channels within a discrete frequency spectrum for communications within the piconet. The exact frequency spectrum and channels are dependent on the particular communications protocol utilized. For example, when using the Bluetooth protocol, as in the preferred embodiment of the present invention, the frequency range is from 2400 to 2483.5 MHz, with 79 discrete channels available between 2402 to 2480 MHz. As used herein, a channel (or "communication path") within a piconet means a duplex channel. As such, a channel includes both inbound and outbound paths.

For security of communications made over the piconet, and to create a more robust piconet that avoids interference, the wireless controllers 2, 3 and 4 may operate within the piconet using a frequency hopping format as is standard in the Bluetooth communications protocol. Frequency hopping may occur pseudorandomly at a rate of 1600 channels per second among a predetermined channel set (e.g., 23 RF channels, 79 RF channels, etc.).

Additionally, under the Bluetooth communications protocol used in the preferred embodiment of the present invention, the time slot on each channel may be 625 microseconds long, and packets within the piconet may be up to five slots long. Data within a packet may be up to 2,745 bits in length.

The information transfer rate within the piconet between the wireless controllers 2, 3 and 4 and the wireless audio communications devices (26, 27, 28, 36, 37, 38, 46, 47 and 48) may be 1 megabit per second ("Mbps") using Bluetooth 1.0 or 1.1, or up to 3 Mbps using Bluetooth 2.0. The bandwidth may be further increased by the use of an alternate communication technology, such as Ultra-Wideband.

As previously discussed, communications between the master wireless controllers 2, 3 and 4 and the slave wireless audio communications devices (26, 27, 28, 36, 37, 38, 46, 47 and 48) may use an SCO link or ACL link, or both, under the Bluetooth communications protocol in the preferred embodiment of the present invention. Each wireless controller 2, 3 and 4 can support up to three SCO links and seven ACL links.

Using SCO links, communications between the master and the slaves may be on reserved channels. SCO links provide a circuit-oriented service with constant bandwidth based on a fixed and periodic allocation of slots. Thus, to provide the highest possible audio quality during conferencing, in the preferred embodiment of the present invention, SCO links are used to carry voice communications between the master wireless controllers 2, 3 and 4 and the slave wireless audio communications devices (26, 27, 28, 36, 37, 38, 46, 47 and 48).

Using ACL links, on the other hand, provides a packet-oriented service with the bandwidth of the piconet divided by the master among the slaves using a polling mechanism. Outbound information (i.e., from the master to the slaves) may be broadcast from the master to all slaves or point-to-point (i.e., from the master to one slave at a time). ACL slaves can only transmit when requested by the master. Since the slave units all transmit one-at-a-time under control of the master, the channels between the master and respective slaves are all different. In the preferred embodiment of the present invention, ACL links are used for the transmission of shared content to the slaves, as further discussed below.

Set up of a piconet channel for a slave unit may be accomplished in any of a number of different ways. Under one embodiment, using the Bluetooth protocol in the preferred embodiment of the present invention, set up between master wireless controllers 2, 3 and 4 and the slave wireless audio communications devices (26, 27, 28, 36, 37, 38, 46, 47 and 48) may occur through a known process referred to as "pairing."

Pairing may be accomplished for a first slave wireless audio communications device 26, by activating a pairing button on the device 26 while at the same time activating a pairing button 6 on the wireless communications connection device of the present invention. In response, the wireless communications connection device transmits a piconet polling packet, including an identifier of the wireless communications connection device, to any nearby devices. Since the pairing button on the device 26 is activated, the device 26 may transmit a response identifying the type of device 26 involved. The wireless communications connection device may receive and analyze the packet to identify the device 26.

Once the device 26 has been identified, the wireless communications connection device may assign a unique address to the device 26 consistent with the type of device involved. The pairing process may be repeated with each of the other slave wireless audio communications devices 27, 28, 36, 37, 38, 46, 47 and 48. In the preferred embodiment of the present invention at least one such slave wireless audio communications device is a cellular phone, and at least one such slave wireless audio communications devices is a wireless headset. Alternatively, if the wireless communications connection device is disposed and integrated within a cellular phone, then the cellular phone may act as the master and, in such as case, at least one wireless headset is paired to the master cellular phone as a slave.

In the preferred embodiment of the present invention, the master wireless controllers 2, 3 and 4 establish simultaneous SCO and ACL links with each slave wireless audio communications device (26, 27, 28, 36, 37, 38, 46, 47 and 48).

Once the slave wireless audio communications devices (26, 27, 28, 36, 37, 38, 46, 47 and 48) have been paired with the wireless controllers 2, 3 and 4 of the wireless communications connection device of the present invention, non-call conferencing may occur between local participants using any paired slave wireless audio communications devices that permit two-way communications, such as a wireless headset (e.g., the Jabra Model BT800), a cellular phone (using the cellular phone's speaker and microphone), or even a computer (using the computer's built-in speaker and microphone).

A conference call between local participants and a remote participant may be established by initiating or receiving a call on one of the paired slave wireless audio communications devices that are capable of such (such as using a paired cellular phone to make cellular phone calls, or using a computer or similar device to contact a remote participant using VOIP (such as by using Skype, MSN Messenger, AOL Instant Messenger or a similar service). It will be appreciated that, in this context, a "call" to a remote participant can include a number of remote communications means for establishing two-way audio communications with a remote participant.

Once a conference call or wireless non-call conferencing is enabled, wireless controllers 2, 3 and 4 may open communications channels between audio interfaces 21, 31 and 41 of wireless controllers 2, 3 and 4, respectively, and audio interface 11 of mixer 1 to permit slave wireless audio communications devices (26, 27, 28, 36, 37, 38, 46, 47 and 48) to communicate with mixer 1.

Within the mixer 1, the audio signals from the slave wireless audio communications devices (26, 27, 28, 36, 37, 38, 46, 47 and 48) are mixed, cleaned, amplified and/or de-amplified, and an equalized output provided to each slave wireless audio communications device (26, 27, 28, 36, 37, 38, 46, 47 and 48). As used herein, mixing means summing the audio input from the slave wireless audio communications devices (26, 27, 28, 36, 37, 38, 46, 47 and 48), dividing the sum by the number of slave wireless audio communications devices (26, 27, 28, 36, 37, 38, 46, 47 and 48), and providing an equalized audio output to each of the slave wireless audio communications devices (26, 27, 28, 36, 37, 38, 46, 47 and 48).

As opposed to prior art audio conferencing systems, the wireless communications connection device of the present invention operates in a full duplex mode with respect to the slave wireless audio communications devices (26, 27, 28, 36, 37, 38, 46, 47 and 48). In this regard, each slave wireless audio communications device (26, 27, 28, 36, 37, 38, 46, 47 and 48) communicates with the mixer 1 over an independent communication channel that is not shared with any other slave wireless audio communications device (26, 27, 28, 36, 37, 38, 46, 47 and 48). Moreover, in a conference call or wireless non-call conferencing configuration, each slave wireless audio communications device (26, 27, 28, 36, 37, 38, 46, 47 and 48) communicates with the wireless controllers 2, 3 and 4 using a Bluetooth SCO link in the preferred embodiment to maximize the quality of the voice communications.

In a second embodiment of the present invention, the wireless communications connection device of the preferred embodiment is enhanced with the ability to share content, such as stereo music, in the absence of a conference call or wireless non-call conferencing. In this embodiment, at least one of the slave wireless audio communications devices (26, 27, 28, 36, 37, 38, 46, 47 and 48) is an audio and/or video content source (such as a computer, MP3 player, or cellular phone) with the ability to transmit (by streaming from an external source and/or from stored audio and/or video files) audio and/or video content. Further, for stereo audio, at least one of the slave wireless audio communications devices (26, 27, 28, 36, 37, 38, 46, 47 and 48) is a headset compatible with the Advanced Audio Distribution Protocol ("A2DP"), and the wireless controllers 2, 3 and 4 are programmed to be A2DP-compliant.

A2DP is a Bluetooth protocol that encapsulates the "Generic Audio/Video Distribution Profile," for setting up a streaming audio or video channel, and the "Audio/Video Distribution Transport" protocol, for controlling streaming digital content over a Bluetooth connection. A2DP defines the protocols and procedures that realize distribution of stereo audio content using ACL links.

In this embodiment, the slave wireless audio communications devices (26, 27, 28, 36, 37, 38, 46, 47 and 48) communicate with the master wireless controllers 2, 3 and 4 using Bluetooth SCO links for voice communications in a conference call or wireless non-call conferencing configuration. However, as discussed above, the slave wireless audio communications devices (26, 27, 28, 36, 37, 38, 46, 47 and 48) have simultaneously established links with the master wireless controllers 2, 3 and 4 using Bluetooth ACL links. In the absence of a conference call or wireless non-call conferencing using the SCO links, the ACL links may be utilized to stream audio and/or video content from the audio and/or video content source to the slave wireless audio communications devices (26, 27, 28, 36, 37, 38, 46, 47 and 48), while the SCO links remain available to use should a conference call or wireless non-call conferencing situation arise.

Specifically, when sharing stereo audio content between an audio and/or video content source and an A2DP-compatible headset over an ACL Bluetooth link, the duplex channel between the master wireless controller and the slave A2DP-compatible headset may predominately be used as a one-way channel. That is, the otherwise two-way communications path permits stereo audio (separated into left and right audio channels) to be transmitted to slave wireless audio communications devices (26, 27, 28, 36, 37, 38, 46, 47 and 48), with one audio channel transmitted over the standard outgoing path and the other audio channel transmitted over the standard incoming path, which has been reversed to a secondary outgoing path in this configuration.

Additionally, under this embodiment of the present invention, the wireless communications connection device includes a means to switch between wireless conferencing between the local participants, wireless conferencing between the local participants and the remote participant, and wireless sharing of audio and/or video content between the local participants. This may include a switch or button to transfer the device between "voice conference mode" (SCO links) and "content sharing mode" (ACL links). Under one embodiment, the transfer from content sharing mode to voice conference mode may be automatically triggered by the making or receiving of a call to a remote party using one of the slave wireless audio communications devices (26, 27, 28, 36, 37, 38, 46, 47 and 48).

The following examples are offered to help illustrate this embodiment.

Example 1

1. The wireless communications connection device of the present invention pairs with a plurality of A2DP-compatible headset devices.
2. The wireless communications connection device of the present invention pairs with a cellular phone for communicating with a remote participant.
3. The wireless communications connection device of the present invention pairs with an audio/video content source, such as an iPod or notebook computer running Apple Computer's iTunes.

In this example, all local participants using paired A2DP-compatible headsets may listen to stereo music and/or watch video streaming from the audio source using the ACL links. When the cellular phone rings from an incoming call from a remote participant, the local participants listening to stereo music may be interrupted to accept or reject the call. If the call is accepted, or if the wireless communications connection device is simply placed into a "voice conference mode," the local participants can conference amongst themselves (wireless non-call conferencing) and optionally participate in a wireless conference call with the remote party through the cellular phone using the SCO links. Local participants may return to content sharing over the ACL links once voice conferencing is complete.

Example 2

1. The wireless communications connection device of the present invention pairs with a plurality of A2DP-compatible headset devices.
2. The wireless communications connection device of the present invention pairs with a cellular phone with built-in content streaming technology.

In this example, the audio and/or video content source has been converged into a single device. Again, all local participants using paired A2DP-compatible headsets may listen to stereo music and/or watch video streaming from the cellular phone using the ACL links. When the cellular phone rings from an incoming call from a remote participant, the local participants listening to stereo music may be interrupted to accept or reject the call. If the call is accepted, or if the wireless communications connection device is simply placed into a "voice conference mode," the local participants can conference amongst themselves (wireless non-call conferencing) and optionally participate in a wireless conference call with the remote party through the cellular phone using the SCO links. Local participants may return to content sharing over the ACL links once voice conferencing is complete.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

What is claimed is:

1. A method for wirelessly conferencing and sharing content among a number of participants in a mobile environment using an electronic device having audio capabilities, such method comprising:
   providing an audio mixer disposed in the electronic device to receive an audio input from each of at least three audio interfaces, to mix and clean an audio signal from the audio inputs and to provide an equalized audio output to each of the at least three audio interfaces;
   providing a first local wireless interface between a first audio interface of the at least three audio interfaces and a wireless headset of a first local participant;
   providing a second local wireless interface between a second audio interface of the at least three audio interfaces and a wireless headset of a second local participant;
   providing a third local wireless interface between a third audio interface of the at least three audio interfaces and a remote communications means for communicating with a remote participant;
   providing simultaneous two-way, full-duplex communications between the first local participant and the second local participant during wireless non-call conferencing between the first local participant and the second local participant and providing simultaneous two-way, full-duplex communications between the first local participant, the second local participant, and the remote participant during wireless conferencing between the first local participant and the second local participant and the remote participant; and
   providing simultaneous one-way communications between an audio and/or video content source and the first local participant and the second local participant during wireless sharing of audio and/or video content between the audio and/or video content source and the first local participant and the second local participant, wherein a first communication path to the first local participant, a second communication path to the second local participant, and a third communication path to the remote participant are all discrete, and wherein the audio and/or video content source is integrated within the remote communications means,
   wherein an antenna of the first local wireless interface, the second local wireless interface, and the third local wireless interface is disposed within the electronic device having audio capabilities.

2. The method for wirelessly conferencing and sharing content among a number of participants in a mobile environment as in claim 1 wherein the audio mixer is a field-programmable gate array.

3. The method for wirelessly conferencing and sharing content among a number of participants in a mobile environment as in claim 1 wherein the first local wireless interface, the second local wireless interface, and the third local wireless interface utilize a Bluetooth protocol.

4. The method for wirelessly conferencing and sharing content among a number of participants in a mobile environment as in claim 1 wherein the remote communications means comprises a cellular phone.

5. The method for wirelessly conferencing and sharing content among a number of participants in a mobile environment as in claim 1 wherein the remote communications means comprises a computer using VOIP technology.

6. The method for wirelessly conferencing and sharing content among a number of participants in a mobile environment as in claim 1 wherein the remote communications means comprises a computer using a webcam.

7. The method for wirelessly conferencing and sharing content among a number of participants in a mobile environment as in claim 1 wherein the remote communications means comprises a personal digital assistant ("PDA").

8. The method for wirelessly conferencing and sharing content among a number of participants in a mobile environment as in claim 1 wherein the simultaneous two-way, full-duplex communications between the first local participant and the second local participant during wireless non-call conferencing between the first local participant and the second local participant and the simultaneous two-way, frill-duplex communications between the first local participant, the second local participant, and the remote participant during wireless conferencing between the first local participant and the second local participant and the remote participant utilize synchronous connection-oriented links under the Bluetooth protocol.

9. The method for wirelessly conferencing and sharing content among a number of participants in a mobile environment as in claim 1 wherein the simultaneous one-way communications between the audio and/or video content source and the first local participant and the second local participant during wireless sharing of audio and/or video content between the first local participant and the second local participant utilize asynchronous connectionless links under the Bluetooth protocol.

10. The method for wirelessly conferencing and sharing content among a number of participants in a mobile environment as in claim 1 wherein the audio and/or video content source comprises a cellular phone.

11. The method for wirelessly conferencing and sharing content among a number of participants in a mobile environment as in claim 1 wherein the audio and/or video content source comprises a computer.

12. The method for wirelessly conferencing and sharing content among a number of participants in a mobile environment as in claim 1 wherein the audio and/or video content source comprises a personal digital assistant ("PDA").

13. The method for wirelessly conferencing and sharing content among a number of participants in a mobile environment as in claim 1 wherein the wireless headset of the first local participant and the wireless headset of the second local participant are A2DP-compliant.

14. The method for wirelessly conferencing and sharing content among a number of participants in a mobile environment as in claim 13 wherein the audio and/or video content comprises stereo audio.

15. The method for wirelessly conferencing and sharing content among a number of participants in a mobile environment as in claim 1 farther comprising:
providing a means for switching between simultaneous two-way, fall-duplex communications between the first local participant and the second local participant during wireless non-call conferencing between the first local participant and the second local participant, simultaneous two-way, fall-duplex communications between the first local participant, the second local participant, and the remote participant during wireless conferencing between the first local participant and the second local participant and the remote participant, and simultaneous one-way communications between the audio and/or video content source and the first local participant and the second local participant during wireless sharing of audio and/or video content between the first local participant and the second local participant.

16. A method for wirelessly conferencing and sharing content among a number of participants in a mobile environment using an electronic device having audio capabilities, such method comprising:
providing an audio mixer, disposed in the electronic device, that receives an audio input from each of at least four audio interfaces, mixes and cleans an audio signal from the audio inputs and provides an equalized audio output to each of the at least four audio interfaces;
providing a first local wireless interface between a first audio interface of the at least four audio interfaces and a wireless headset of a first local participant;
providing a second local wireless interface between a second audio interface of the at least four audio interfaces and a wireless headset of a second local participant;
providing a third local wireless interface between a third audio interface of the at least four audio interfaces and a remote communications means for communicating with a remote participant;
providing a fourth local wireless interface between a fourth audio interface of the at least four audio interfaces and an audio and/or video content source;
providing simultaneous two-way, full-duplex communications between the first local participant and the second local participant during wireless non-call conferencing between the first local participant and the second local participant and providing simultaneous two-way, full-duplex communications between the first local participant, the second local participant, and the remote participant during wireless conferencing between the first local participant and the second local participant and the remote participant; and
providing simultaneous one-way communications between the audio and/or video content source and the first local participant and the second local participant during wireless sharing of audio and/or video content between the audio and/or video content source and the first local participant and the second local participant, wherein a first communication path to the first local participant, a second communication path to the second local participant, and a third communication path to the remote participant are all discrete;
wherein an antenna of the first local wireless interface, the second local wireless interface, and the third local wireless interface is disposed within the electronic device having audio capabilities.

17. The method for wirelessly conferencing and sharing content among a number of participants in a mobile environment as in claim 16 wherein the audio mixer is a field-programmable gate array.

18. The method for wirelessly conferencing and sharing content among a number of participants in a mobile environment as in claim 16 wherein the first local wireless interface, the second local wireless interface, the third local wireless interface, and the fourth local wireless interface utilize a Bluetooth protocol.

19. The method for wirelessly conferencing and sharing content among a number of participants in a mobile environment as in claim 16 wherein the remote communications means comprises a cellular phone.

20. The method for wirelessly conferencing and sharing content among a number of participants in a mobile environment as in claim 16 wherein the remote communications means comprises a computer using VOIP technology.

21. The method for wirelessly conferencing and sharing content among a number of participants in a mobile environment as in claim 16 wherein the remote communications means comprises a computer using a webcam.

22. The method for wirelessly conferencing and sharing content among a number of participants in a mobile environment as in claim 16 wherein the remote communications means comprises a personal digital assistant ("PDA").

23. The method for wirelessly conferencing and sharing content among a number of participants in a mobile environment as in claim 16 wherein the simultaneous two-way, full-duplex communications between the first local participant and the second local participant during wireless non-call conferencing between the first local participant and the second local participant and providing simultaneous two-way, full-duplex communications between the first local participant, the second local participant, and the remote participant during wireless conferencing between the first local participant and the second local participant and the remote participant utilize synchronous connection-oriented links under the Bluetooth protocol.

24. The method for wirelessly conferencing and sharing content among a number of participants in a mobile environment as in claim 16 wherein the simultaneous one-way communications between the audio and/or video content source and the first local participant and the second local participant during wireless sharing of audio and/or video content between the audio and/or video content source and the first local participant and the second local participant utilize asynchronous connectionless links under the Bluetooth protocol.

25. The method for wirelessly conferencing and sharing content among a number of participants in a mobile environment as in claim 16 wherein the audio and/or video content source comprises a cellular phone.

26. The method for wirelessly conferencing and sharing content among a number of participants in a mobile environment as in claim 16 wherein the audio and/or video content source comprises a computer.

27. The method for wirelessly conferencing and sharing content among a number of participants in a mobile environment as in claim 16 wherein the audio and/or video content source comprises an MP3 player.

28. The method for wirelessly conferencing and sharing content among a number of participants in a mobile environment as in claim 16 wherein the audio and/or video content source comprises a personal digital assistant ("PDA").

29. The method for wirelessly conferencing and sharing content among a number of participants in a mobile environment as in claim 16 wherein the wireless headset of the first local participant and the wireless headset of the second local participant are A2DP-compliant.

30. The method for wirelessly conferencing and sharing content among a number of participants in a mobile environment as in claim 16 wherein the audio and/or video content comprises stereo audio.

31. The method for wirelessly conferencing and sharing content among a number of participants in a mobile environment as in claim 16 farther comprising:
providing a means for switching between the simultaneous two-way, full-duplex communications between the first local participant and the second local participant during wireless non-call conferencing between the first local participant and the second local participant, the simultaneous two-way, frill-duplex communications between the first local participant, the second local participant, and the remote participant during wireless conferencing between the first local participant and the second local participant and the remote participant, and the simultaneous one-way communications between the audio and/or video content source and the first local participant and the second local participant during wireless sharing of audio and/or video content between the first local participant and the second local participant.

32. An apparatus for wirelessly conferencing and sharing content among a number of participants in a mobile environment using an electronic device having audio capabilities, such apparatus comprising:
an audio mixer, disposed in the electronic device, that receives an audio signal from an audio input from each of at least three audio interfaces, mixes and cleans the audio inputs, and provides an equalized audio output to each of the at least three audio interfaces;
a first local wireless interface between a first audio interface of the at least three audio interfaces and a wireless headset of a first local participant;
a second local wireless interface between a second audio interface of the at least three audio interfaces and a wireless headset of a second local participant; and
a third local wireless interface between a third audio interface of the at least three audio interfaces and a remote communications means for communicating with a remote participant, wherein the audio mixer permits simultaneous two-way, frill-duplex communications between the first local participant and the second local participant during wireless non-call conferencing between the first local participant and the second local participant and permits simultaneous two-way, frill-duplex communications between the first local participant, the second local participant, and the remote participant during wireless conferencing between the first local participant and the second local participant and the remote participant;
wherein the audio mixer provides simultaneous one-way communications between an audio and/or video content source and the first local participant and the second local participant during wireless sharing of audio and/or video content between the first local participant and the second local participant, and wherein a first communication path to the first local participant, a second communication path to the second local participant, and a third communication path to the remote participant are all discrete; and
wherein an antenna of the first local wireless interface, the second local wireless interface, and the third local wireless interface is disposed within the electronic device having audio capabilities.

33. The apparatus for wirelessly conferencing and sharing content among a number of participants in a mobile environment as in claim 32 wherein the audio mixer is a field-programmable gate array.

34. The apparatus for wirelessly conferencing and sharing content among a number of participants in a mobile environment as in claim 32 wherein the first local wireless interface, the second local wireless interface, and the third local wireless interface utilize a Bluetooth protocol.

35. The apparatus for wirelessly conferencing and sharing content among a number of participants in a mobile environment as in claim 32 wherein the remote communications means comprises a cellular phone.

36. The apparatus for wirelessly conferencing and sharing content among a number of participants in a mobile environment as in claim 32 wherein the remote communications means comprises a computer using VOIP technology.

37. The apparatus for wirelessly conferencing and sharing content among a number of participants in a mobile environment as in claim 32 wherein the remote communications means comprises a computer using a webcam.

38. The apparatus for wirelessly conferencing and sharing content among a number of participants in a mobile environment as in claim 32 wherein the remote communications means comprises a personal digital assistant ("PDA").

39. The apparatus for wirelessly conferencing and sharing content among a number of participants in a mobile environment as in claim 32 wherein the simultaneous two-way, full-duplex communications between the first local participant and the second local participant during wireless non-call conferencing between the first local participant and the second local participant and the simultaneous two-way, full-duplex communications between the first local participant, the second local participant, and the remote participant during wireless conferencing between the first local participant and the second local participant and the remote participant utilize synchronous connection-oriented links under the Bluetooth protocol.

40. The apparatus for wirelessly conferencing and sharing content among a number of participants in a mobile environment as in claim 32 wherein the simultaneous one-way communications between the audio and/or video content source and the first local participant and the second local participant during wireless sharing of audio and/or video content between the first local participant and the second local participant utilize asynchronous connectionless links under the Bluetooth protocol.

41. The apparatus for wirelessly conferencing and sharing content among a number of participants in a mobile environment as in claim 32 wherein the audio and/or video content source comprises a cellular phone.

42. The apparatus for wirelessly conferencing and sharing content among a number of participants in a mobile environment as in claim 32 wherein the audio and/or video content source comprises a computer.

43. The apparatus for wirelessly conferencing and sharing content among a number of participants in a mobile environment as in claim 32 wherein the audio and/or video content source comprises a personal digital assistant ("PDA").

44. The apparatus for wirelessly conferencing and sharing content among a number of participants in a mobile environment as in claim 32 wherein the wireless headset of the first local participant and the wireless headset of the second local participant are A2DP-compliant.

45. The apparatus for wirelessly conferencing and sharing content among a number of participants in a mobile environment as in claim 44 wherein the audio and/or video content comprises stereo audio.

46. The apparatus for wirelessly conferencing and sharing content among a number of participants in a mobile environment as in claim 32 further comprising:
    a means for switching between simultaneous two-way, full-duplex communications between the first local participant and the second local participant during wireless non-call conferencing between the first local participant and the second local participant, simultaneous two-way, full-duplex communications between the first local participant, the second local participant, and the remote participant during wireless conferencing between the first local participant and the second local participant and the remote participant, and simultaneous one-way communications between the audio and/or video content source and the first local participant and the second local participant during wireless sharing of audio and/or video content between the first local participant and the second local participant.

* * * * *

UNITED STATES PATENT AND TRADEMARK OFFICE
CERTIFICATE OF CORRECTION

PATENT NO. : 7,707,250 B2  Page 1 of 2
APPLICATION NO. : 11/381210
DATED : April 27, 2010
INVENTOR(S) : Darren S. Guccione It is certified that error appears in the above-identified patent and that said Letters Patent is hereby corrected as shown below:

The Abstract should read as amended and allowed by the examiner in the Amendment After Allowance as follows:

"A method and apparatus is provided for setting up a wireless conference call, wireless non-call conference, and sharing audio and/or video content. The method includes the steps of providing an audio mixer that receives an audio input from each of at least three audio interfaces, mixes, cleans, and amplifies and/or de-amplifies the audio signal from the audio inputs and provides an equalized audio output to each of the at least three audio interfaces; providing a first local wireless interface; providing a second local wireless interface; and, providing a third wireless interface, so as to permit simultaneous two-way (incoming and outgoing) communications between each participant during wireless conferencing, and so as to permit simultaneous one-way communications between an audio and/or video content source and each local participant during wireless sharing of audio and/or video content between the local participants."

Column 1, lines 43 and 48: The " " should be removed

Column 7, line 30: The "," should be replaced with a closed parenthesis and should read "...cellular phone calls) or using..."

Column 11, line 15 (claim 8): The word "frill-duplex" should be replaced with the word "full-duplex"

Column 11, line 54 (claim 15): The word "farther" should be replaced with the word "further"

Column 11, line 56 (claim 15): The word "fall-duplex" should be replaced with the word "full-duplex"

Column 11, line 60 (claim 15): The word "fall-duplex" should be replaced with the word "full-duplex"

Column 13, line 64 (claim 31): The word "frill-duplex" should be replaced with the word "full-duplex"

Column 14, line 26 (claim 32): The word "frill-duplex" should be replaced with the word "full-duplex"

Signed and Sealed this

Thirteenth Day of July, 2010

David J. Kappos
*Director of the United States Patent and Trademark Office*

Column 14, lines 30-31 (claim 32): The word "frill-duplex" should be replaced with the word "full-duplex"